US008418185B2

(12) United States Patent
Durham et al.

(10) Patent No.: US 8,418,185 B2
(45) Date of Patent: Apr. 9, 2013

(54) MEMORY MAXIMIZATION IN A HIGH INPUT/OUTPUT VIRTUAL MACHINE ENVIRONMENT

(75) Inventors: Pamela C. Durham, Apex, NC (US); Nils Peter Joachim Hansson, Monroe, WA (US); Edward S. Suffern, Chapel Hill, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 219 days.

(21) Appl. No.: 12/907,352

(22) Filed: Oct. 19, 2010

(65) Prior Publication Data

US 2012/0096473 A1    Apr. 19, 2012

(51) Int. Cl.
*G06F 9/455* (2006.01)
*G06F 9/46* (2006.01)
*G06F 15/16* (2006.01)
*G06F 15/173* (2006.01)

(52) U.S. Cl.
USPC ............... 718/104; 718/1; 718/105; 709/201; 709/223; 709/224; 709/226

(58) Field of Classification Search .................. None
See application file for complete search history.

(56) References Cited

U.S. PATENT DOCUMENTS

| 7,127,716 | B2 | 10/2006 | Jin et al. |
| 7,162,711 | B2 | 1/2007 | Czajkowski et al. |
| 7,165,108 | B2 | 1/2007 | Matena et al. |
| 7,213,065 | B2 | 5/2007 | Watt |
| 7,257,811 | B2 | 8/2007 | Hunt et al. |
| 7,395,388 | B2 | 7/2008 | Sugiura et al. |
| 7,437,730 | B2 * | 10/2008 | Goyal .......................... 718/105 |
| 7,716,377 | B2 | 5/2010 | Harris et al. |

(Continued)

FOREIGN PATENT DOCUMENTS

| JP | 3065734 A | 3/1991 |
| JP | 4355836 A | 12/1992 |

OTHER PUBLICATIONS

IBM—"Automatic Virtual Machine Provisioning"; IPCOM000128928D; 4 pages, Sep. 21, 2005.

(Continued)

*Primary Examiner* — Jennifer To
*Assistant Examiner* — Bradley Teets
(74) *Attorney, Agent, or Firm* — Cynthia G. Seal; Jeffrey L. Streets

(57) ABSTRACT

A computer implemented method is provided, including monitoring the utilization of resources available within a compute node, wherein the resources include an input/output capacity, a processor capacity, and a memory capacity. The method further comprises allocating virtual machines to the compute node to maximize use of a first one of the resources; and then allocating an additional virtual machine to the compute node to increase the utilization of the resources other than the first one of the resources without over-allocating the first one of the resources. In a web server, the input/output capacity may be the resource to be maximized. However, unused memory capacity and/or processor capacity of the compute node may be used more effectively by identifying an additional virtual machine that is memory intensive or processor intensive to be allocated or migrated to the compute node. The additional virtual machine(s) may be identified in new workload requests or from analysis of virtual machines running on other compute nodes accessible over the network.

13 Claims, 6 Drawing Sheets

U.S. PATENT DOCUMENTS

| | | | |
|---|---|---|---|
| 8,302,098 B2* | 10/2012 | Johnson et al. | 718/102 |
| 2003/0217166 A1 | 11/2003 | Dal Canto et al. | |
| 2007/0130566 A1 | 6/2007 | van Rietschote et al. | |
| 2007/0271560 A1* | 11/2007 | Wahlert et al. | 718/1 |
| 2007/0288921 A1 | 12/2007 | King et al. | |
| 2008/0091761 A1 | 4/2008 | Tsao | |
| 2008/0196043 A1 | 8/2008 | Feinleib et al. | |
| 2008/0307183 A1 | 12/2008 | DeVal et al. | |
| 2009/0106409 A1 | 4/2009 | Murata | |
| 2009/0150529 A1* | 6/2009 | Tripathi | 709/222 |
| 2009/0172666 A1* | 7/2009 | Yahalom et al. | 718/1 |
| 2009/0228589 A1* | 9/2009 | Korupolu | 709/226 |
| 2010/0083248 A1* | 4/2010 | Wood et al. | 718/1 |
| 2010/0138829 A1 | 6/2010 | Hanquez et al. | |

OTHER PUBLICATIONS

Chang-et al.; "Virtual machine support for zero-loss Internet service recovery"; INSPEC/Software: Practice & Experience, vol. 37, No. 13, pp. 1349-1376; Nov. 2007.

Jian Wang, "Survey of State-of-the-art in Inter-VM Communication Mechanisms", Sep. 27, 2009, pp. 1-25.

* cited by examiner

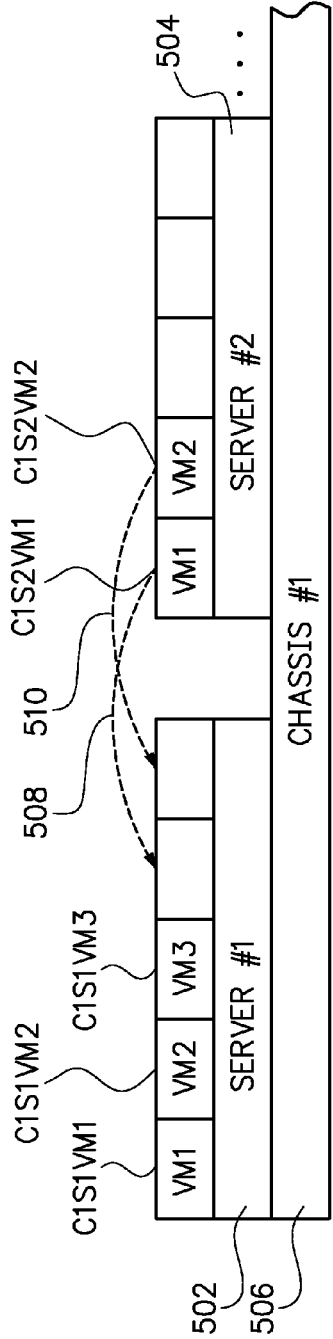

MEMORY MAXIMIZATION IN A HIGH INPUT/OUTPUT VIRTUAL MACHINE ENVIRONMENT

BACKGROUND

1. Field of the Invention

The present invention relates to the management of virtual machines. More specifically, the present invention relates to management of the system resources in a virtual machine environment.

2. Background of the Related Art

In a cloud computing environment, a user is assigned a virtual machine somewhere in the computing cloud. The virtual machine provides the software operating system and has access to physical resources, such as input/output bandwidth, processing power and memory capacity, to support the user's application. Provisioning software manages and allocates virtual machines among the available computer nodes in the cloud. Because each virtual machine runs independent of other virtual machines, multiple operating system environments can co-exist on the same physical computer in complete isolation from each other.

BRIEF SUMMARY

One embodiment of the present invention provides a computer-implemented method, comprising monitoring the utilization of resources available to a compute node, wherein the resources include an input/output capacity, a processor capacity, and a memory capacity, allocating virtual machines to the compute node to maximize use of a first one of the resources; and then allocating an additional virtual machine to the compute node to increase the utilization of the compute node resources other than the first one of the resources without over-allocating the first one of the resources.

BRIEF DESCRIPTION OF THE SEVERAL VIEWS OF THE DRAWINGS

FIG. 4 is a table illustrating certain data maintained by a management node including a provisioning manager.

FIG. 5 is a block diagram illustrating the migration of virtual machines between two servers.

DETAILED DESCRIPTION

Figure 1:
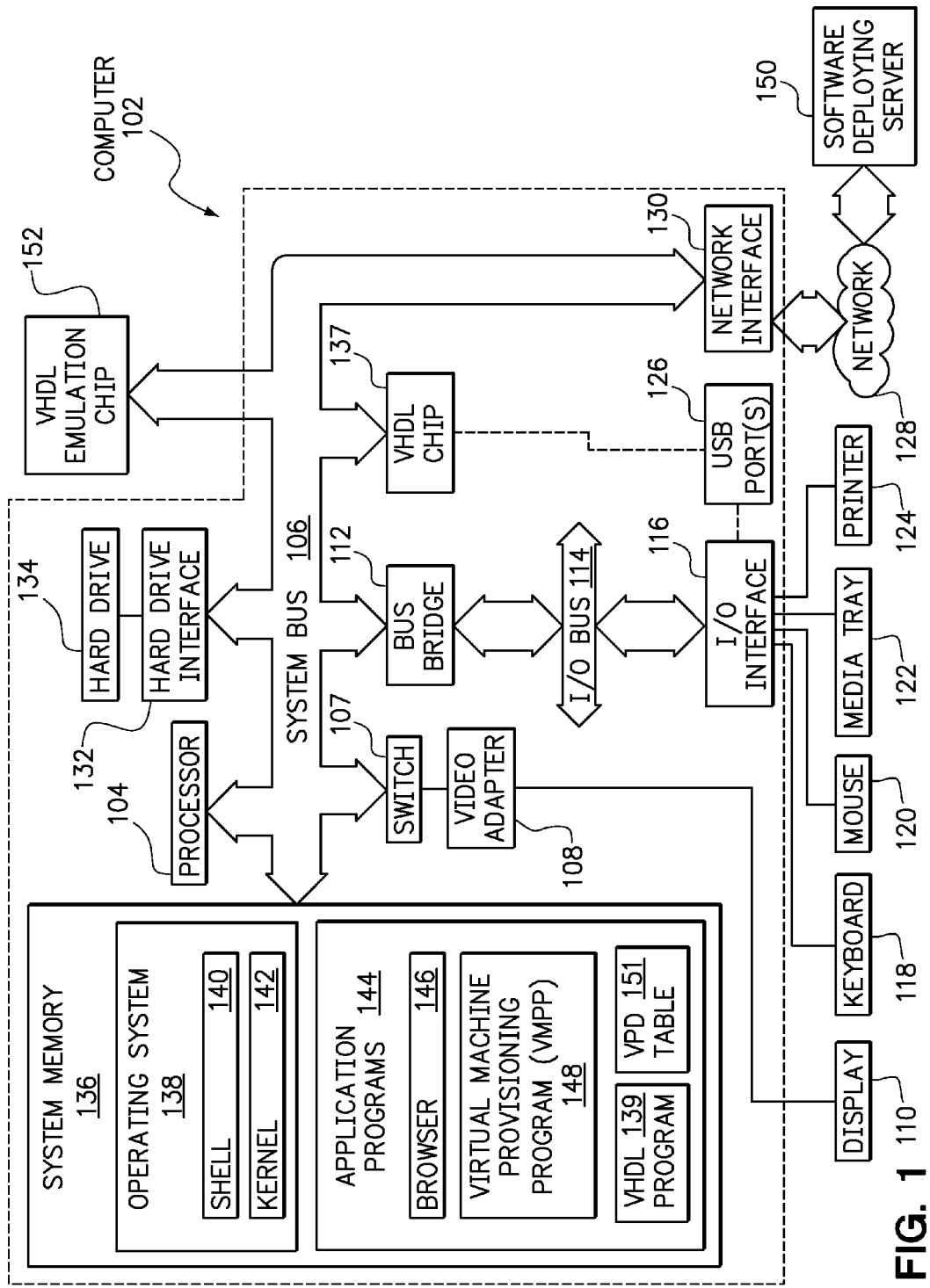
FIG. 1 depicts an exemplary computer that may be utilized in accordance with the present invention.

One embodiment of the present invention provides a computer implemented method, comprising monitoring the utilization of resources available to a compute node, wherein the resources include an input/output capacity, a processor capacity, and a memory capacity. The method further comprises allocating virtual machines to the compute node to maximize use of a first one of the resources; and then allocating an additional virtual machine to the compute node to increase the utilization of the compute node resources other than the first one of the resources without over-allocating the first one of the resources.

For example, the first one of the resources may be the network input/output capacity of the compute node. The input/output capacity would typically be the resource to be maximized where the compute node is operating primarily as a web server or video file server. However, maximizing utilization of the input/output capacity may leave a significant portion of the memory capacity and/or processor capacity of the compute node unused. These unused resources may be used more effectively by identifying an additional virtual machine that is memory intensive or processor intensive to be allocated or migrated to the compute node. It should be recognized that the additional virtual machine(s) may be identified in new workload requests or from analysis of virtual machines running on other compute nodes accessible over the network.

In the context of this application, virtual machines may be described as using various amounts of input/output capacity, memory capacity, and processor capacity, and may accordingly be identified as being input/output intensive, memory intensive and/or processor intensive. However, it should be recognized that the amount of the resources utilized by a virtual machine is largely a function of the software task that is assigned to the virtual machine. For example, computer-aided drafting and design (CADD) applications and large spreadsheet applications require heavy computation and would be considered to be processor intensive. These applications require very little network bandwidth and can be relocated or allocated to a physical server with a number of highly interactive web serving applications that have used up bandwidth, but have additional memory or processor resources available. By contrast, financial applications using database management require much more processing capacity and memory capacity with a reduced utilization of input/output bandwidth.

In a further embodiment of the method, virtual machines are identified as input/output intensive, processor intensive, or memory intensive according to the type of application assigned to run on the virtual machine. This identification may be automatic, such as by looking at a file extension or metadata associated with the application, or manual, whereby a user or administrator makes a case-by-case identification or provides a rule by which the resource utilization of an application is to be identified.

In a still further embodiment of the method, the input/output utilization (bandwidth) of a virtual machine may be directly measured where the virtual machine is running on a compute node that is coupled to an Ethernet link of a network switch, such as a high speed switch module (HSSM). Accordingly, data is obtained from a management information database (MIB) of the network switch which identifies the amount of network bandwidth through the Ethernet link that is being utilized by each of the virtual machines allocated to the compute node. For example, the amount of network bandwidth attributable to a given virtual machine may be identified according to a media access control (MAC) address or an Internet Protocol (IP) address that is assigned to the virtual machine. This process allows the identification of input/output utilization by numerous virtual machines that are running on any compute node that is coupled to an Ethernet link of a network switch within the relevant network.

In another embodiment, the allocation of the additional virtual machine to the first compute node includes migrating the additional virtual machine from a second compute node to the first compute node. Optionally, the second compute node is coupled to an Ethernet link of a network switch and the amount of network bandwidth (input/output utilization) used by the additional virtual machine is obtained from a management information database of the network switch. Accordingly, the additional virtual machine for migration to the first compute node is selected, potentially from among all of the virtual machines on the network, on the basis of the low amount of network bandwidth utilized by the additional virtual machine.

In yet another embodiment, the method further comprises obtaining the processor utilization and the memory utilization of the compute node directly from the compute node. Those skilled in the art will realize that this information is available from the hypervisor task manager which obtains the memory required and the CPU utilization from all the processes executing on the physical compute node. The processor and memory utilization indicates the amount of processor and memory capacity that is currently in use or, conversely, allows the determination of the amount of processor and memory capacity that is not currently in use. It is therefore possible to determine, either as part of the virtual machine selection process or at least prior to migrating, that the target compute node has sufficient unused processor and memory capacity to run the additional virtual machine.

In conjunction with various embodiments of the method, it is also possible to determine the input/output capacity, the processor capacity, and the memory capacity of the compute node by reading the vital product data of the compute node. Subtracting the input/output utilization, the processor utilization, and the memory utilization from the input/output capacity, the processor capacity, and the memory capacity, respectively, yields the unused amount of each of these resources. Accordingly, the input/output requirements, the processor requirements, and the memory requirements of the virtual machines can be compared with the unused amount of resources on a particular compute node to identify an additional virtual machine that can be accommodated to increase the resource utilization without over-allocating any of the resources.

Since virtual machines are allocated to the compute node to maximize the use of a first one of the resources, the additional virtual machine must use sufficiently little of the maximized resource such that the maximized resource is not over allocated. Optionally, a suitable additional virtual machine may utilize less than a set point amount of the first one of the resources. The set point amount of the resource may be a fixed amount or a variable amount equal to the unused amount of the resource. For example, where the input/output capacity of the compute node has been maximized and has less than five percent of the input/output capacity unused, a suitable additional virtual machine for migration to the compute node may be a virtual machine whose input/output requirement would constitute less than five percent of the input/output capacity of the compute node. In a further option, a preferred additional virtual machine will utilize more of the unused portion of the other resources (resources other than the first resource that is being maximized) than other candidate virtual machines. In a continuation of the previous example, the additional virtual machine may utilize less than five percent of the input/output capacity of the computer, and may further utilize half of the unused memory capacity and/or processor capacity of the compute node.

With reference now to the figures, FIG. 1 is a block diagram of an exemplary computer 102, which may be utilized by the present invention. Note that some or all of the exemplary architecture, including both depicted hardware and software, shown for and within computer 102 may be utilized by software deploying server 150, as well as provisioning manager/management node 222, and server blades 204a-n shown below in FIG. 2 and FIG. 6. Note that while blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," "server," and "compute node" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below) external USB port(s) 126. While the format of the ports connected to I/O interface 116 may be any known to those skilled in the art of computer architecture, in a preferred embodiment some or all of these ports are universal serial bus (USB) ports.

As depicted, the computer 102 is able to communicate with a software deploying server 150 via network 128 using a network interface 130. The network 128 may be an external network such as the Internet, or an internal network such as an Ethernet or a virtual private network (VPN).

A hard drive interface 132 is also coupled to the system bus 106. The hard drive interface 132 interfaces with a hard drive 134. In a preferred embodiment, the hard drive 134 communicates with a system memory 136, which is also coupled to the system bus 106. System memory is defined as a lowest level of volatile memory in the computer 102. This volatile memory includes additional higher levels of volatile memory (not shown), including, but not limited to, cache memory, registers and buffers. Data that populates the system memory 136 includes the operating system (OS) 138 and application programs 144 of the computer 102.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 is a text-based, line-oriented user interface, the present invention will equally well support other user interface modes, such as graphical, voice, gestural, etc.

As depicted, the operating system 138 also includes kernel 142, which includes lower levels of functionality for the operating system 138, including providing essential services required by other parts of the operating system 138 and application programs 144, including memory management, process and task management, disk management, and mouse and keyboard management.

The application programs 144 include a renderer, shown in exemplary manner as a browser 146. The browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in the system memory of the computer 102 (as well as the system memory of the software deploying server 150) also include a virtual machine provisioning program (VMPP) 148. The VMPP 148 includes code for implementing the processes described below, including those described in FIGS. 2-8. The VMPP 148 is able to communicate with a vital product data (VPD) table 151, which provides required VPD data described below. In one embodiment, the computer 102 is able to download the VMPP 148 from software deploying server 150, including in an on-demand basis. Note further that, in one embodiment of the present invention, the software deploying server 150 performs all of the functions associated with the present invention (including execution of VMPP 148), thus freeing the computer 102 from having to use its own internal computing resources to execute the VMPP 148.

Optionally also stored in the system memory 136 is a VHDL (very high speed integrated circuit "VHSIC" hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes VHDL program 139 to configure VHDL chip 137, which may be an FPGA, ASIC, etc.

In another embodiment of the present invention, execution of instructions from the VMPP 148 results in a utilization of the VHDL program 139 to program a VHDL emulation chip 152. The VHDL emulation chip 152 may incorporate a similar architecture as described above for VHDL chip 137. Once VMPP 148 and VHDL program 139 program the VHDL emulation chip 152, VHDL emulation chip 152 performs, as hardware, some or all functions described by one or more executions of some or all of the instructions found in VMPP 148. That is, the VHDL emulation chip 152 is a hardware emulation of some or all of the software instructions found in VMPP 148. In one embodiment, VHDL emulation chip 152 is a programmable read only memory (PROM) that, once burned in accordance with instructions from VMPP 148 and VHDL program 139, is permanently transformed into a new circuitry that performs the functions needed to perform the process described below in FIGS. 2-8.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
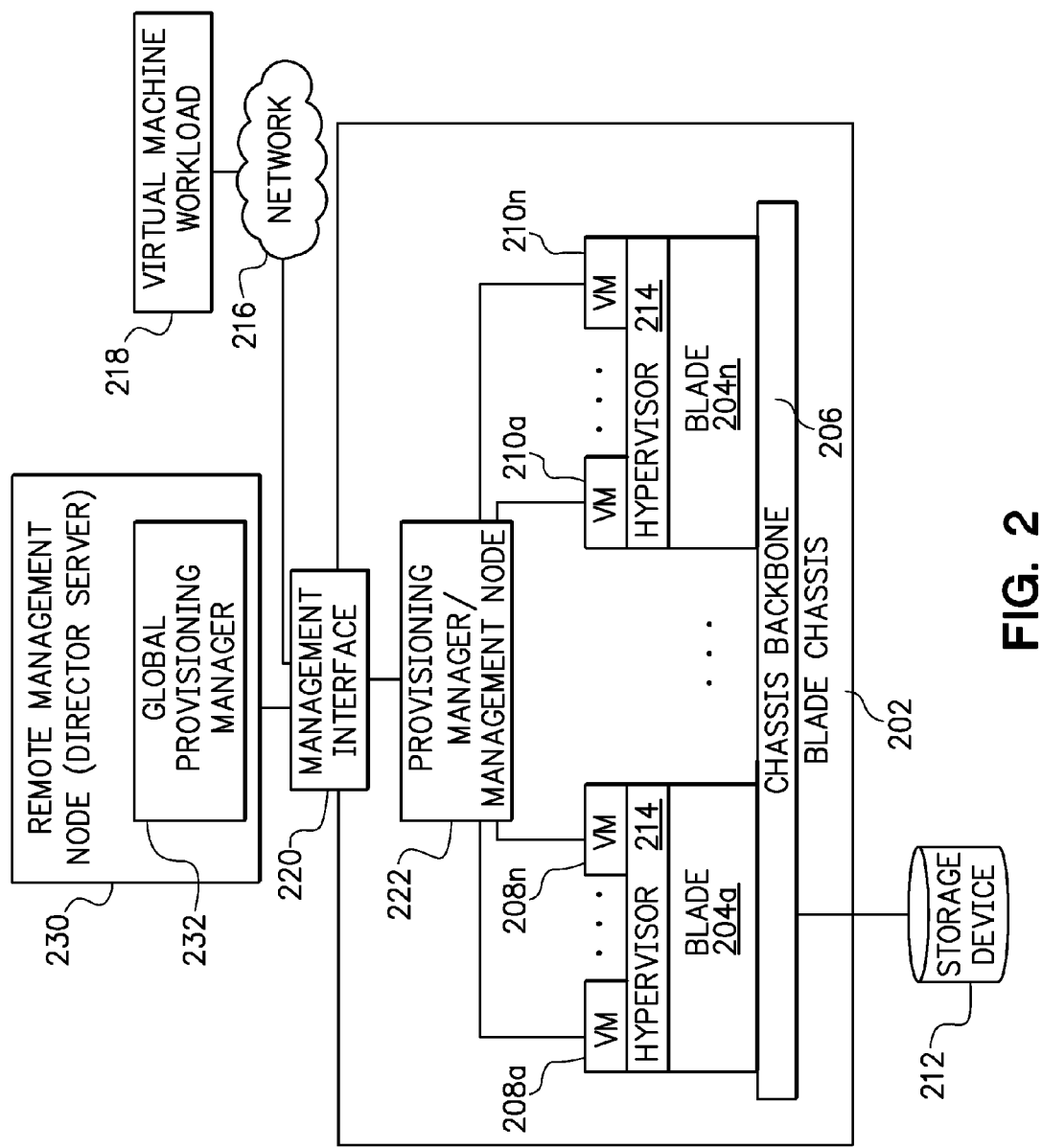
FIG. 2 illustrates an exemplary blade chassis that may be utilized in accordance with the present invention.

FIG. 2 is a diagram of an exemplary blade chassis 202 operating as a "cloud" environment for a pool of resources. Blade chassis 202 comprises a plurality of blades 204a-n (where "n" is an integer) coupled to a chassis backbone 206. Each blade is able to support one or more virtual machines (VMs). As known to those skilled in the art of computers, a VM is a software implementation (emulation) of a physical computer. A single physical computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As shown in FIG. 2, the blade 204a supports a plurality of VMs 208a-n (where "n" is an integer), and the blade 204n supports a further plurality of VMs 210a-n (wherein "n" is an integer). The blades 204a-n are coupled to a storage device 212 that provides a hypervisor 214, guest operating systems, and applications for users (not shown). Provisioning software from the storage device 212 is loaded into the provisioning manager/management node 222 to allocate virtual machines among the blades in accordance with various embodiments of the invention described herein. The computer hardware characteristics are communicated from the VPD 151 to the VMPP 148 (per FIG. 1). The VMPP may communicate the computer physical characteristics to the blade chassis provisioning manager 222 to the management interface 220 through the network 216, and then to the Virtual Machine Workload entity 218.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution is requested on any of the VMs within the blade chassis 202. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the generic computer system (See FIG. 1). Note that the blade chassis 202 is an exemplary computer environment in which the presently disclosed system can operate. The scope of the presently disclosed system should not be limited to merely blade chassis, however. That is, the presently disclosed method and process can also be used in any computer environment that utilizes some type of workload management, as described herein. Thus, the terms "blade chassis," "computer chassis," and "computer environment" are used interchangeably to describe a computer system that manages multiple computers/blades/servers.

FIG. 2 also shows an optional remote management node 230, such as an IBM Director Server, in accordance with a further embodiment of the invention. The remote management node 230 is in communication with the chassis management node 222 via the Management Interface 220. A global provisioning manager 232 is therefore able to communicate with the (local) provisioning manager 222 and work together to perform the methods of the present invention. The optional global provisioning manager is primarily beneficial in large installations having multiple chassis or racks of servers, where the global provisioning manager can coordinate inter-chassis migration or allocation of VMs.

The global provisioning manager preferably keeps track of the VMs of multiple chassis or multiple rack configurations. If the local provisioning manager is able, that entity will move VMs within the chassis or rack and send that information to the global provisioning manager. The global provisioning manager would be involved in moving VMs among multiple chassis or racks. For example, the global provisioning manager 232 may build and maintain a table containing the same VM data as the local provisioning manager 222, except that the global provisioning manager would need that data for VMs in each of the chassis or racks in the multiple chassis or multiple rack system. The tables maintained by the global provisioning manager 232 and each of the local provisioning managers 222 would be kept in sync through ongoing communication with each other. Beneficially, the multiple tables provide redundancy that allows continued operation in case one of the provisioning managers stops working.

Figure 3:
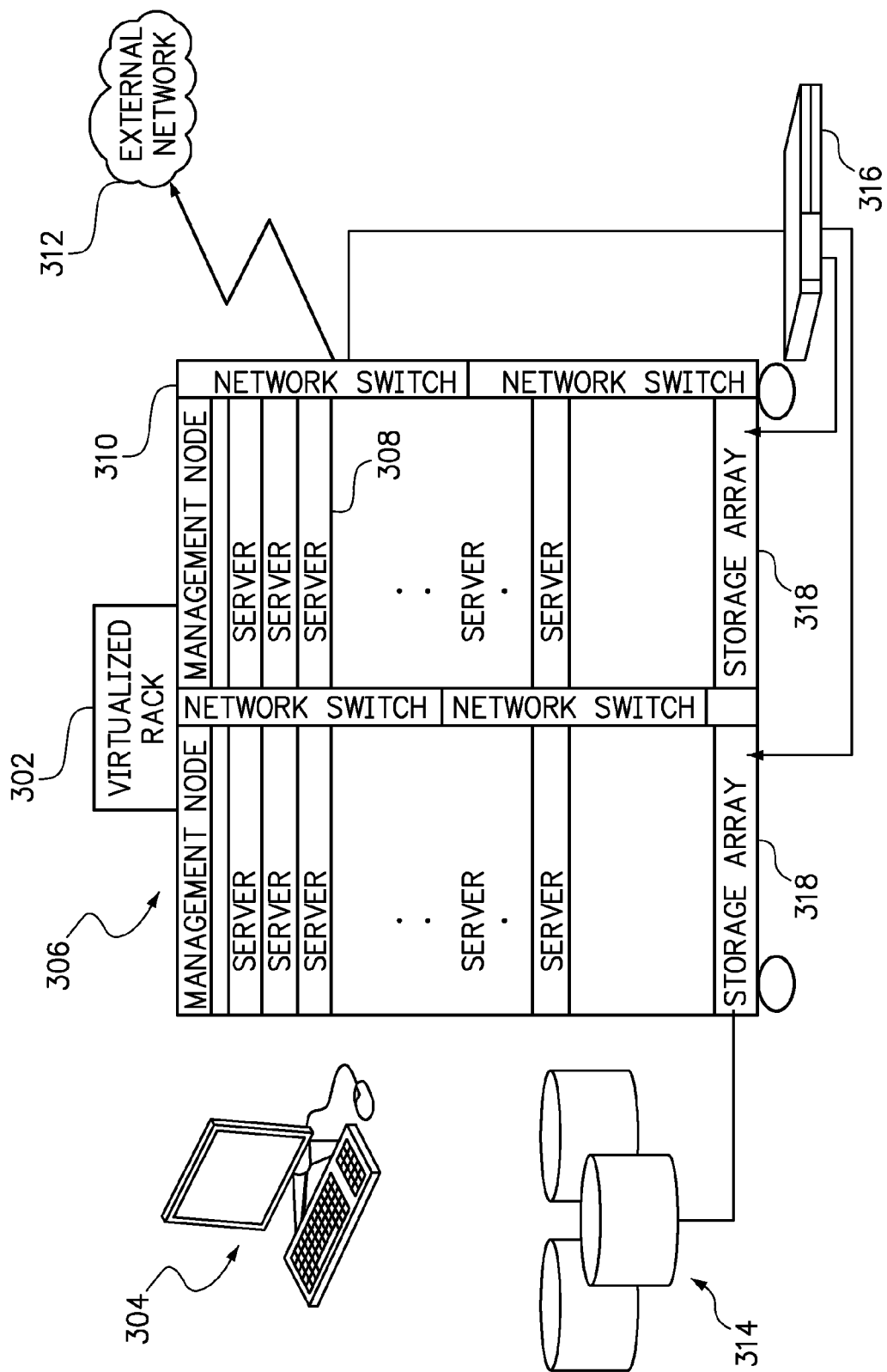
FIG. 3 depicts another embodiment of the present disclosed method utilizing multiple physical computers in a virtualized rack.

FIG. 3 presents one embodiment of the present invention with multiple physical servers in a 19-inch rack environment. This configuration is similar to the configuration 202 shown in FIG. 2 except FIG. 3 depicts a virtualized rack 302. A user 304 is able to transmit a request for execution of a software task to a management node 306 (analogous to provisioning manager/management node 222 shown in FIG. 2). Based on the I/O capabilities of a particular server 308 and its coupled network switch 310 to communicate with external network 312 and storage devices 314 (via gateway 316 and virtualized storage arrays 318), the user's request is addressed to the appropriate and optimal computer (e.g., server 308). The virtualized rack 302 is, for example, a blade chassis holding multiple servers. Each physical server (including server 308) has I/O network adapters to support input/output traffic. To determine the optimal number of virtual machines able to execute on the server, the provisioning manager must be able to retrieve the network configuration of the physical server (I/O capability) and coordinate this information to properly provision VMs on each of the servers.

FIG. 4 is a table 400 illustrating certain data obtained by a management node including a provisioning manager. As shown, the first column 402 identifies each virtual machine by a unique ID that collectively comprises a chassis number, server number and virtual machine number. For example, in the first row of the table below the header, the virtual machine ID "C1S1VM1" refers to a virtual machine #1 on a server #1 in a chassis #1. Only a portion of the table is shown, including three virtual machines on server 1 of chassis 1, and two virtual machines on server 2 of chassis 1. Server 1 and server 2 can communicate with each other, as well as with the provisioning manager, over a network switch. The bandwidth utilized by each virtual machine is listed in the second column 404 in units of Megabits per second (Mpbs), the percentage of processor capacity utilized by each virtual machine is listed in the third column 406, and the amount of memory used by each virtual machine is listed in the fourth column 408. Furthermore, the header of the second column 404 shows that VPD has identified each of server 1 and server 2 as having 1 Gpbs of input/output capacity, and the header of the fourth column 408 shows each server as having 1 TB (terabyte) of memory.

While the two server system represented by the table 400 in FIG. 4 is quite small, this example is representative of two servers in a system having any number of servers in any number of chassis. Analyzing the data in the table 400, the three virtual machines allocated to server 1 collectively use 850 Mbps of the 1 Gbps bandwidth available to server 1. Accordingly, server 1 has only 150 Mbps of unused input/output capacity. If these three virtual machines are representative of web server software tasks or application, then it may be unlikely to find a further web server-type virtual machine that can be allocated to server 1 without exceeding the bandwidth limitation. However, those same three virtual machines are using only 25% of the processor capacity and 170 GB of the 1 TB memory capacity. The three input/output intensive virtual machines on server 1 cause a significant amount of unused processor and memory capacity.

Server 2 has two virtual machines that are only using 10 Mbps bandwidth each, and a total of 700 GB memory utilization and 50% processor utilization. Accordingly, both of these virtual machines use very little network bandwidth, and may be characterized as processor intensive and/or memory intensive. Accordingly, both of the virtual machines on server 2 may be selected to be migrated from server 2 to server 1. Once migrated, server 1 will use 870 Mbps (of 1 Gpbs input/output capacity), 75% of the processor capacity, and 870 GB (of 1 TB memory capacity).

The provisioning manager will preferably also be aware of the bandwidth requirements of any new virtual machine or software task being requested, as well as the bandwidth utilization of all the current virtual machines in the cloud. Using this information, the provisioning manager can install a new virtual machine to handle a new workload request on a physical server that has high bandwidth utilization, but excess memory capacity.

FIG. 5 is a block diagram of a system 500 with the virtual machines represented in table 400 of FIG. 4 running on server 1 (502) and server 2 (504) of chassis 1 (506). The migration of C1S2VM1 from server 2 to server 1 is represented by the arrow 508 and the migration of C1S2VM2 from server 2 to server 1 is represented by the arrow 510. If server 2 has no remaining virtual machines, then server 2 may be powered down to save energy.

Figure 6:
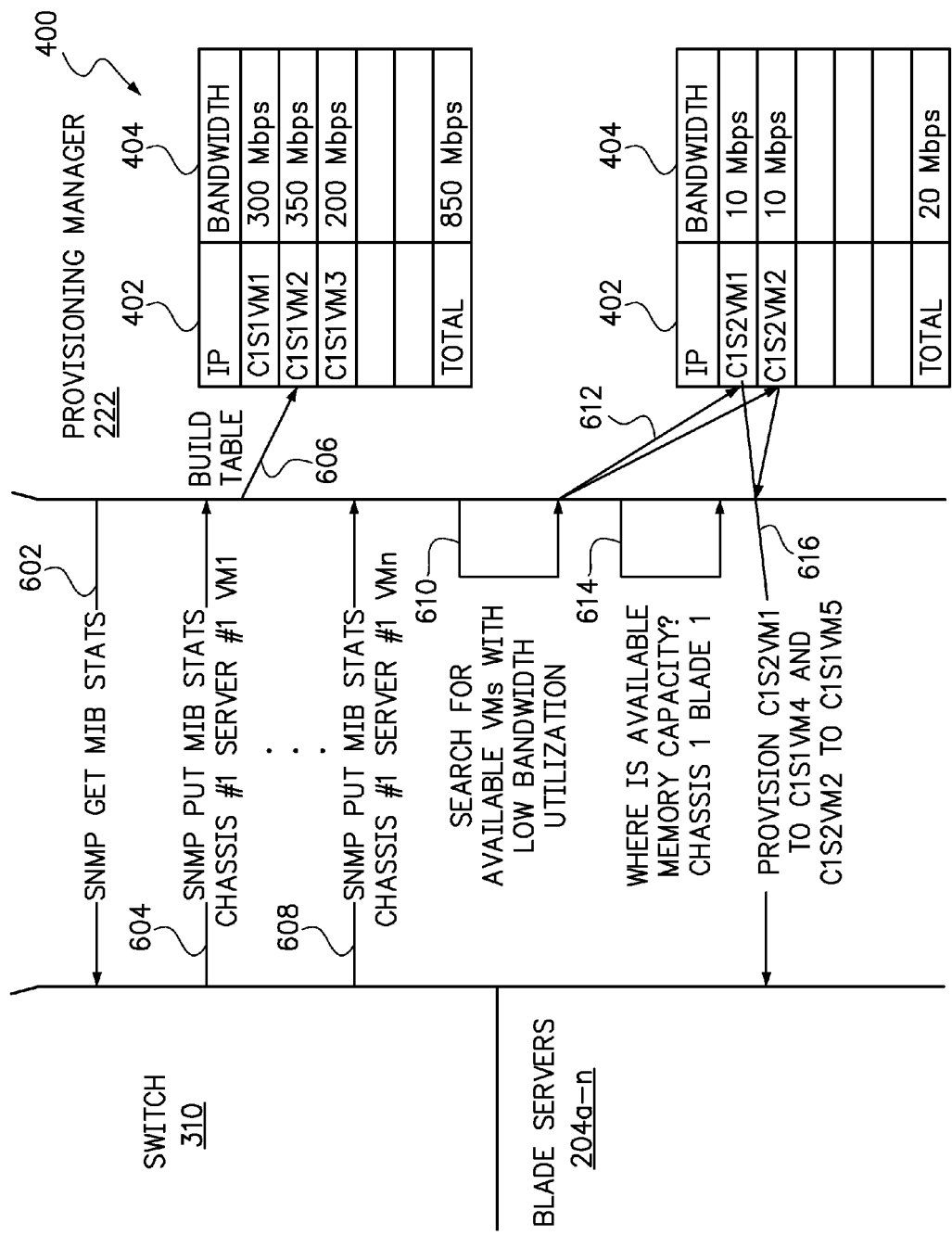
FIG. 6 is a ladder diagram of a method for utilizing unused processor or memory capacity in a high input/output virtual machine environment.

FIG. 6 is a ladder diagram of a method for utilizing unused processor or memory capacity in a high input/output virtual machine environment. Communications occur between a provisioning manager/management node 222, a switch 310, and blade servers (e.g., blades 204a-n shown in FIG. 2). In step 602, the provisioning manager sends a request for management information base (MIB) statistics to the network switch 310. For example, the request may be in the form of a simple network management protocol (SNMP) GET request/command (i.e., SNMP GET MIB Stats). In step 604, the switch 310 responds with the requested statistics, such as with a SNMP PUT (i.e., SNMP PUT MIB Stats). In step 606, the MIB Stats allow the provisioning manager 222 to build or populate part of a table to include the bandwidth being used by virtual machine 1 on server 1. In step 608, additional SNMP PUT MIB Stats may be communicated from the switch 310 to the provisioning manager 222 for each of the other virtual machines on server 1. A portion of the table 400 (from FIG. 4) is reproduced in FIG. 6.

In step 610, the provisioning manager searches for available virtual machines having low bandwidth utilization (i.e., at least less than the 150 Mbps bandwidth that is unused by server 1). Such a search may involve further SNMP GET requests to switch 310 or any other switch in the network, so that in step 612 additional virtual machine bandwidth utilization data can be added to the table. If a complete table of virtual machines and their resource usage in the network is already available, then the search may focus on column 404 of the table 400. In step 614, an analysis of unused memory capacity (or similarly an analysis of unused processor capacity) is performed in order to identify a server having sufficient unused memory capacity to facilitate migration of the one of the low bandwidth virtual machines. Referring back to FIG. 4 and the discussion thereof, it is found that C1S2VM1 can be migrated from server 2 of chassis 1 to server 1 of chassis 1 to become C1S1VM4 and C1S2VM2 can be migrated from server 2 of chassis 1 to server 1 of chassis 1 to become C1S1VM5, in accordance with step 616 (See also FIG. 5 illustrating the same migration).

Figure 7:
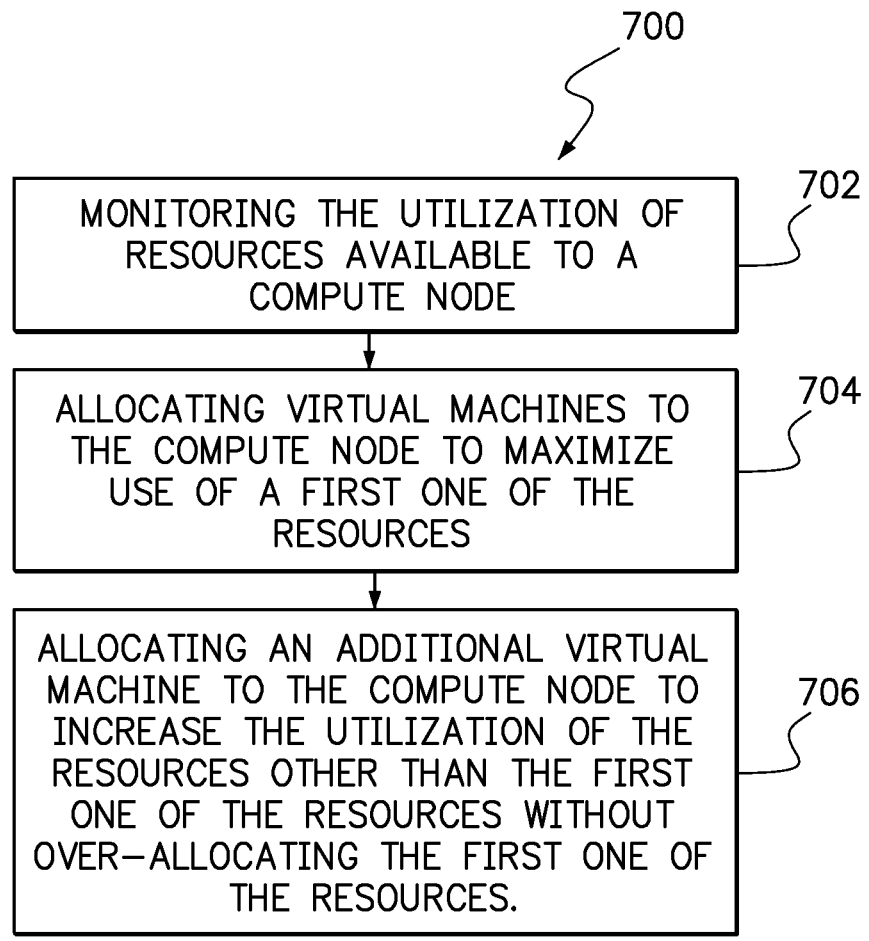
FIG. 7 is a flowchart of a computer-implemented method in accordance with one embodiment of the invention.

FIG. 7 is a flowchart of a computer implemented method 700. In step 702, the method includes monitoring the utilization of resources available to a compute node, wherein the resources include an input/output capacity, a processor capacity, and a memory capacity. In step 704, virtual machines are allocated to the compute node to maximize use of a first one of the resources. Then, in step 706, an additional virtual machine is allocated to the compute node to increase the utilization of the resources other than the first one of the resources without over-allocating the first one of the resources.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable storage medium having computer-usable program code stored thereon.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer implemented method, comprising:
   monitoring the utilization of resources available to a compute node, wherein the resources comprise an input/output capacity, a processor capacity, and a memory capacity;
   allocating a plurality of virtual machines to the compute node to maximize use of a first one of the resources wherein the plurality of virtual machines are identified as input/output intensive, processor intensive, or memory intensive according to the type of application assigned to run on the virtual machine; and then
   allocating an additional virtual machine to the compute node to increase the utilization of the resources other than the first one of the resources without over-allocating the first one of the resources wherein the additional virtual machine has a greater utilization of a second one of the resources than does other virtual machines currently allocated to the compute node, wherein the second one of the resources has a greater availability on the compute node than the availability of the first one of the resources.

2. The computer implemented method of claim 1, wherein the first one of the resources is the input/output capacity.

3. The computer implemented method of claim 2, wherein the at least one additional virtual machine is assigned to execute a software task that is processor intensive or memory intensive.

4. The computer implemented method of claim 2, further comprising:
   receiving a workload request for a virtual machine to execute a software task that is processor intensive or memory intensive; and
   assigning the software task to the additional virtual machine.

5. The computer implemented method of claim 2, wherein the additional virtual machine utilizes less than the remaining capacity of the input/output capacity of the first compute node.

6. The computer implemented method of claim 1, wherein the additional virtual machine utilizes less than a set point amount of the first one of the resources.

7. The computer implemented method of claim 1, wherein the compute node is coupled to an Ethernet link of a network switch, the method further comprising:
   obtaining data from a management information database of the network switch to determine the amount of network bandwidth through the Ethernet link that is being utilized by the virtual machines allocated to the compute node.

8. The computer implemented method of claim 7, wherein the amount of network bandwidth attributable to the additional virtual machine is identified according to a media access control address or an Internet Protocol address that is assigned to the additional virtual machine.

9. The computer implemented method of claim 1, wherein the allocation of the additional virtual machine to the first compute node includes migrating the additional virtual machine from a second compute node to the first compute node.

10. The computer implemented method of claim 9, wherein the second compute node is coupled to an Ethernet link of a network switch, the method further comprising:
    obtaining data from a management information database of the network switch to determine the amount of network bandwidth through the Ethernet link that is being utilized by virtual machines allocated to the second compute node; and
    selecting the additional virtual machine for migration to the first compute node on the basis of the low amount of network bandwidth utilized by the additional virtual machine.

11. The computer implemented method of claim 10, wherein the amount of network bandwidth attributable to the additional virtual machine is identified according to a media access control address or an Internet Protocol address that is assigned to the additional virtual machine.

12. The computer implemented method of claim 1, further comprising:
    reading the vital product data of the compute node to determine the input/output capacity, the processor capacity, and the memory capacity of the compute node.

13. The computer implemented method of claim 1, further comprising:
    obtaining the processor utilization and the memory utilization of the compute node directly from the compute node.

* * * * *